United States Patent [19]

Fooshee

[11] Patent Number: 4,558,314
[45] Date of Patent: Dec. 10, 1985

[54] CONDUCTIVE FLUID OPTICAL DISPLAY PANEL AND METHOD OF MANUFACTURE

[76] Inventor: Robert Fooshee, 4323 Clear Park Pl., San Jose, Calif. 95136

[21] Appl. No.: 454,061

[22] Filed: Dec. 28, 1982

[51] Int. Cl.4 .................................................. G08B 5/00
[52] U.S. Cl. ..................................... 340/788; 340/783; 340/815.27
[58] Field of Search ...................... 340/815.24, 815.27, 340/783, 788, 763, 815.05, 764; 350/267; 29/602 R, 606, 609

[56] References Cited

U.S. PATENT DOCUMENTS

| | | | |
|---|---|---|---|
| 3,648,269 | 3/1972 | Rosenweig et al. | 340/815.24 |
| 3,863,249 | 1/1975 | Olah | 340/815.27 |
| 3,935,571 | 1/1976 | Sargent | 340/815.24 |
| 3,972,595 | 8/1976 | Romankiw et al. | 340/815.24 |
| 4,079,368 | 3/1978 | DiStefano | 340/764 |
| 4,384,761 | 5/1983 | Brady et al. | 350/267 |

Primary Examiner—Gerald L. Brigance
Assistant Examiner—Jeffery A. Brier
Attorney, Agent, or Firm—Paul L. Hickman

[57] ABSTRACT

The thin optical display panel of any convenient area formed of a plurality of pixel elements, each element comprising a pair of small, thin cavities in each transparent surface of the panel. Two cavities in each element are interconnected by a small conduit and one cavity in the conduit is filled with conductive opaque fluid, such as mercury or the like. The fluid in the conduit is subjected to a transverse, reversible magnetic field and a transverse, reversible current so that the fluid may be selectively and rapidly transferred between the cavities by electromagnetic pumping action. The indicia on the surfaces of the display panel are formed by appropriate selection of the directions of either the magnetic field or the transverse current in the many elements forming the panel.

10 Claims, 9 Drawing Figures

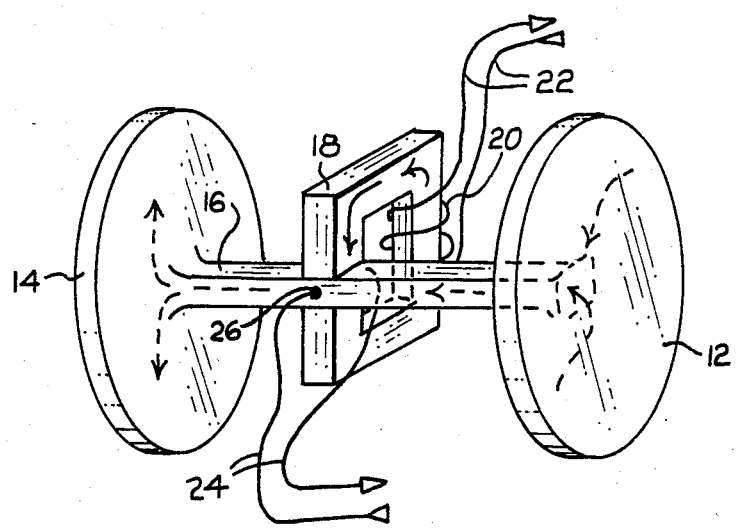
FIG-1-
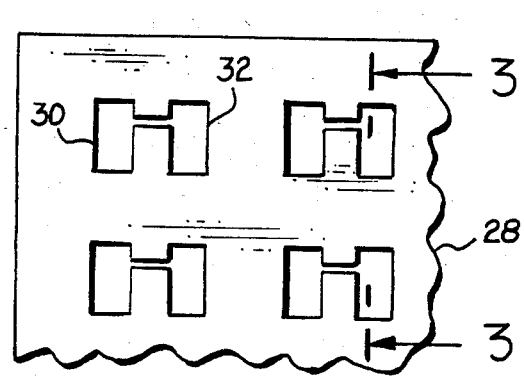
FIG-2-
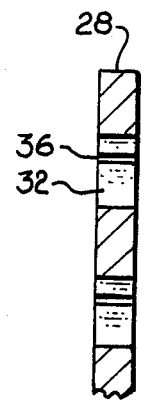
FIG-3-
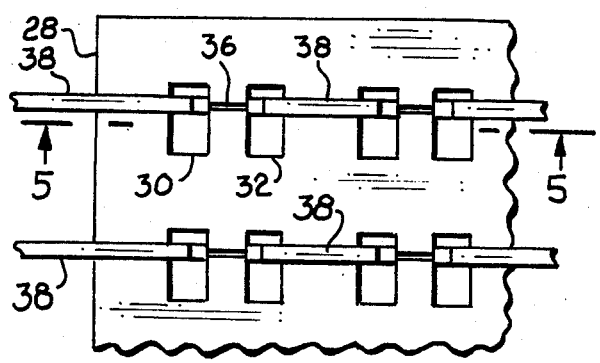
FIG-5-
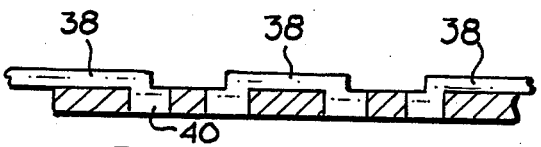
FIG-4-

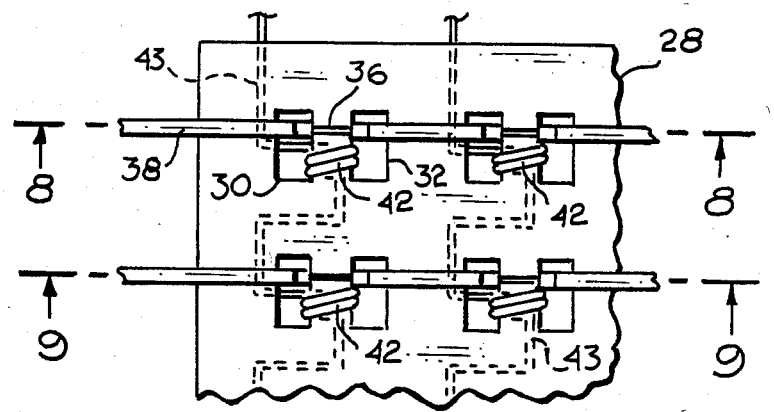
FIG-6-
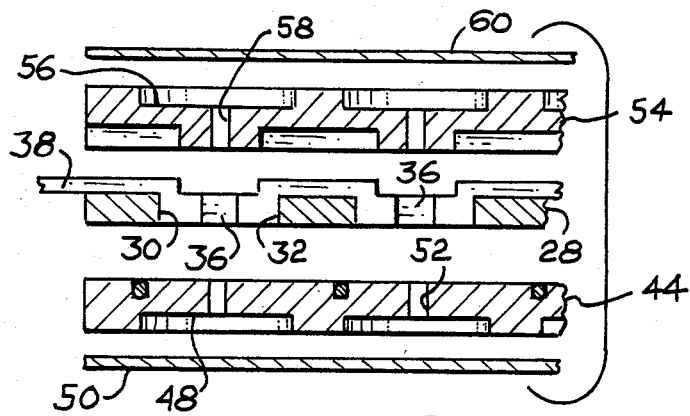
FIG-7-
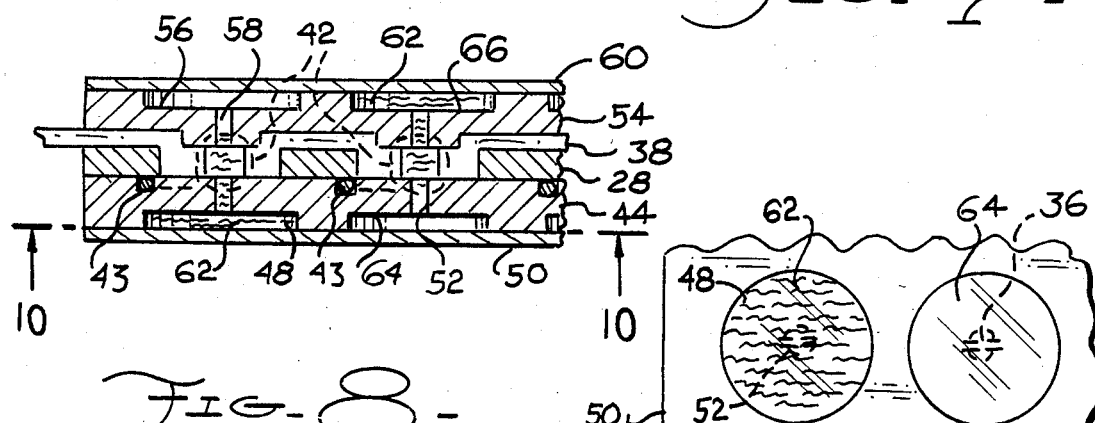
FIG-8-
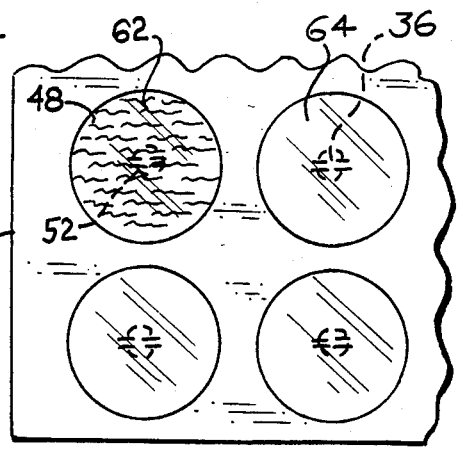
FIG-9-

CONDUCTIVE FLUID OPTICAL DISPLAY PANEL AND METHOD OF MANUFACTURE

BACKGROUND OF THE INVENTION

1. Field of the Invention

This invention relates to electronic displays and in particular to a thin panel display in which indicia are formed by the pumping of a fluid into selected pixel cavities behind the transparent surface of the panel.

2. Description of the Prior Art

One of the most common types of electronic display is the Cathode Ray Tube (C.R.T). Unfortunately, C.R.T.'s are bulky and have high voltage and power requirements.

Several inventors have developed flat screen displays. For example, in U.S. Pat. No. 3,863,249 of Olah a flat screen display is taught where an opaque, magnetic fluid is pumped in and out of pixel cavities to create indicia on a screen. Sargent in U.S. Pat. No. 3,935,571 and Rosenweig in U.S. Pat. No. 3,648,269 also describe display devices utilizing magnetic fluids.

In U.S. Pat. No. 4,079,368 DiStenfano teaches a display utilizing an electric field at the interface of two immiscible dielectrics. U.S. Pat. Nos. 3,530,606 and 3,516,185 teach fluid displays which utilize mechanical pumping mechanisms.

A disadvantage with prior art flat screen displays is that they are relatively complex and have substantial power requirements.

SUMMARY OF THE INVENTION

A major object of this invention is to provide an uncomplicated, reliable, and efficient flat screen display.

Briefly described, the display panel employs the principles of Faraday pumping to rapidly transfer a conductive fluid to and from cavities formed behind the display panel's transparent viewing surface. Faraday pumping is a process in which an electrically conductive liquid is made to move through a conduit by passing a current (either A.C. or D.C) transversely through the liquid. This current reacts with a magnetic field (A.C. or D.C., respectively) that is at right angles to the conduit and to the current flow to move the current-carrying conductive liquid in a direction depending upon the instantaneous direction of the magnetic field and the applied current.

The display panel of the present invention includes a number of elements arranged in an X-Y matrix of suitable dimensions. Each element in the panel includes a thin cavity and a fluid reservoir of identical volume that is separated from the cavity by an interconnecting conduit. The reservoir is preferably identical with and parallel to the cavity and may form elements of a rear viewing surface for displaying "negative" or reversed images. The negative image can be optically reversed by a mirror for viewing.

The interconnecting conduit and either the cavity or the reservoir is filled with an electrically conductive fluid such as mercury or a colored opaque conductive fluid. A current-carrying coil formed into a yoke around the interconnecting conduit produces a transverse magnetic field, and an applied transverse current through the fluid in the conduit reacts with the field to pump the fluid between the cavity and the reservoir depending upon the direction of the current and magnetic field. Surface tension of the fluid retains the fluid in the cavity or reservoir when the applied field or direct current is removed.

An advantage of this invention is that it is a logical replacement for conventional, bulky cathode ray tubes. Unlike the cathode ray tubes, the thin flat display may be manufactured in any desired or convenient size without focus degradation and may be viewed indefinitely at close range without any danger from harmful radiation exposure.

Another advantage of this invention is that Faraday pumping is relatively more efficient than the pumping methods of the prior art, minimizing the power requirements of the display.

These and other objects and advantages of the present invention will no doubt become apparent upon a reading of the following descriptions and a study of the several figures of the drawing.

BRIEF DESCRIPTION OF THE DRAWING

FIG. 1 is a perspective view of a single display element illustrating the principles of operation of the display; and FIGS. 2-9 are illustrations of the various sequential steps in the production of a practical display panel.

DETAILED DESCRIPTION OF THE PREFERRED EMBODIMENT(S)

FIG. 1 is a perspective view of a display element comprising a thin, hollow cavity 12 formed of a transparent material or having a transparent exterior surface, and an interior surface provided with a contrasting color. The element of FIG. 1 includes a second cavity 14 of similar volume and dimensions as the cavity 12. The cavities 12 and 14 are aligned in a vertical parallel plane and are separated by a horizontal tubular conduit 16 which interconnects the cavities at a point near the centers of their interior surfaces. The tubular conduit 16 and either one of the cavities 12 or 14 are filled with an electrically conductive fluid, and the unfilled cavity is evacuated to a pressure near the vapor pressure of the fluid so that the fluid may readily flow between cavities without undue pressure buildup or loss in the element.

The electrically conductive fluid is selectively and rapidly pumped between cavities 12 and 14 by Faraday or electromagnetic pumping action. In the embodiment illustrated in FIG. 1, the magnetic field necessary for Faraday pumping is generated by a magnetic yoke 18 having a gap into which the conduit 16 is placed. One leg of yoke 18 carries a coil 20 terminating in lead wires 22 which are coupled to an external source of current. When energized, the coil 20 generates a magnetic flux path through the yoke 18 and across its gap to thereby apply a magnetic field through the conductive fluid in a vertical direction normal to the axis of the conduit 16.

When a current is passed through the fluid in a direction at right angles to both the axis of the conduit 16 and the vertical magnetic field, the fluid is pumped through in a direction that depends upon the instantaneous direction of current flow and the instantaneous direction of the vertical magnetic field. Therefore, current wires 24 are coupled through openings 26 in the side walls of the conduit 16 to the conductive fluid contained therein and, when connected to an external current source, will pass current through the fluid in a horizontal direction at right angles to the vertical magnetic field and the axis of the conduit 16.

The Faraday pumping can be accomplished by either a D.C. current and a D.C. magnetic field, or by an A.C. current and an A.C. magnetic field. While the D.C. system may be easier to conceptualize, the A.C. system may be advantageous for certain applications.

When the conduit 16 and one of the cavities, such as the cavity 12, is filled with the conductive fluid and either the magnetic field or the current or both are turned off, the surface tension of the fluid in the small conduit 16 will prevent flow through the conduit and into the evacuated cavity 14. Thus, the empty cavity 14 will appear black through its transparent exterior surface, whereas the fluid-filled cavity 12 will appear silver if filled with mercury, or will take on the color of the fluid if filled with a different conductive fluid. When current of appropriate polarity is passed through the wires 22 and 24, the conductive fluid within the conduit 16 and cavity 12 will be rapidly pumped into the cavity 14 so that the appearances of cavities 12 and 14 will be rapidly reversed. A reversal of the polarity in either one of the wires 22 or 24 will similarly pump the fluid from the cavity 14 back into the cavity 12.

A matrix of a relatively large plurality of the Faraday pumped fluid elements, such as described above, forms a thin character display panel which displays characters or other images on one surface, and may display the "negative" image on the opposite surface. In such a panel, each of the cavities, such as the cavities 12 or 14, represents one pixel, or picture element. A relatively large number of pixels may be required to form a display panel and several individual display panels may be assembled to form one large display panel. Such a panel would normally be viewed from one surface so that one cavity, such as the cavity 14, may be considered the pixel cavity, whereas the opposite cavity 12 may be considered the reservoir cavity for the storage of the conductive fluid which will be pumped into the pixel cavity 14.

For sharp detail and picture clarity, the viewing surface of the pixel cavity may have a minimum dimension of approximately 0.5 to 0.25 millimeter (or less), this minimum size being limited by fabrication methods. For very large scale displays, the viewing area of each pixel cavity may be a square meter or more, although elements of this size must include means for overcoming the gravitational effects of the fluid in the reservoir or cavity.

FIGS. 2 through 9 are presented to illustrate the preferred steps in the production of a display panel formed of a matrix of pixel cavities which may be two to three millimeters square. The drawings illustrate the construction of only four such cavities and it is to be understood that a panel of approximately 0.5 square meter may contain approximately 120,000 of such pixel elements, each containing the proper quantity of a conductive fluid and each containing means for applying current transversely through the fluid in a magnetic field of right angles thereto. FIGS. 2 through 9 illustrate sequential steps for the practical fabrication of such large display panels.

FIG. 2 illustrates a small section of a sheet 28 of a ferrous alloy that may have a thickness for example of approximately 0.5 millimeters. A pair of rectangular holes, such as the holes 30 and 32, are cut or punched through the sheet 28 at the location of each of the plurality of cavity and reservoir pairs.

The next step is the cutting of interconnecting slits, such as the slit 36, between each pair of rectangular holes at locations that will ultimately be across the center of the cavities. The slit 36 is preferably approximately 0.1 millimeter in width and will become a portion of the conduit that interconnects the reservoir with the pixel cavity. The sheet 28, including the surfaces of the holes 30 and 32 and the slit 36 is then coated with a very thin coating of a suitable electrical insulation.

The next step in the assembly of the display panel is the installation of the electric current conductors and the conductors that generate the magnetic field at right angles to the current flow. As illustrated in FIG. 4, thin, electrically conductive bridges 38 are placed in the rectangular holes. The conductive bridges have base sections 40 that correspond in width to the width of each rectangular hole and the bases are placed so that their exterior edges lie across the ends of the interconnecting slits 36. When the interconnecting slits are eventually filled with the conductive fluid described in connection with FIG. 1, the conductive bridges 38 will contact the fluid and provide electrical conductivity across an entire row of display elements.

FIG. 4 illustrates the bridges 38 placed in position in the rectangular holes and FIG. 5 is a plan view showing the conductive bridges 38 centered across the interconnecting slits 36 to therefore seal off the sides of the slit and provide electrical conductivity to the fluid which will be contained in the slit 36.

FIG. 6 is a plan view similar to that of FIG. 6 illustrating the installation of conductive coils 42 around the center section between the rectangular hole pairs 30 and 32. All the coils are connected in series by conductors 43 through each vertical column of elements. Thus, to select any one of the plurality of elements in the entire display panel, it is only necessary to apply current only to one electrical conductor and one magnetic field co-conductor. Faraday pumping will take place in the conduit at the intersection of the two selected conductors. It is also possible to Faraday pump an entire vertical column or an entire horizontal row of elements by applying current through all vertical conductors to generate the magnetic fields and only one row of horizontal current-carrying bridges, or by applying excitation current through only one column of magnetic field coils while applying current through all horizontal current-carrying bridges.

FIG. 7 is a sectional edge view taken along the lines 8—8 of FIG. 6 and illustrates the conductive bridges 38 in place across their respective rectangular holes, such as holes 30 and 32, and also the magnetic field coil 42 around that portion of the ferrous material between the holes 30 and 32. The next step in the assembly of the panel is to form the two cavity panels on the surfaces of the ferrous alloy sheet 28. The first cavity panel 44 has a substantially flat inner surface sealed to the the bottom surface of the sheet 28 over the coils 42 and the interconnecting conductors 43. The opposite or outer surface of the cavity panel 44 contains indentations 48 which will form either the reservoir or the pixel cavity when covered with a suitable transparent cover plate 50. Centrally located in the cavity indentations 48 is a central hole or aperture 52 which interconnects the center of the cavity indentations 48 with the interconnecting slit 36 of FIG. 6 and which may now be considered as the electrically conductive fluid conduit, such as the conduit 16 of FIG. 1.

After the transparent cover sheet 50 has been cemented into place on the exterior surface of the cavity panel 44, a second cavity panel 54, which is substantially identical with the panel 44, is sealed to the top surface of the ferrous sheet 28 and over the conductive bridges 38. As with the panel 44, the second cavity panel 54 contains cavity indentations 56 and centrally located apertures 58 that are aligned with the interconnecting slits 36 to complete the conduit between the cavity indentations 54 and 48.

Prior to the installation and sealing of a transparent cover plate 60 to the exterior surface of the second cavity panel 54, each of the lower cavity indentations 48 and the interconnecting conduits which now include the holes 52, the slit 36 in the ferrous sheet 28, and the hole 58 in the cavity indentations 56, must be filled with a suitable conductive fluid. The fluid level should be between the top edge of the conductive slit 36 and the bottom of the cavity indentation 56 so that the conductive fluid will always be in the slit and therefore within an applied magnetic field and applied current. After filling the lower cavities and the conduit to the appropriate level, the transparent cover sheet 60 is sealed to the exterior surface of the second cavity panel 54 in a vacuum environment. As previously mentioned, the vacuum should be at a pressure near the vapor pressure of the conductive fluid so that the conductive fluid being pumped between the reservoir and pixel cavity will not be impeded by pressures or vacuums within the cavities.

FIG. 8 is a sectional edge view, taken along lines 9—9 of FIG. 6, showing an edge view of the assembled panel. In FIG. 8, the electrically conductive fluid 62 is shown in the cavity indentation 48 and extending up through the conduit into the hole 58 in the second cavity panel 54. In the second element of FIG. 8, the fluid 62 has been pumped from the lower cavity 64 and is now contained within the upper cavity 66.

FIG. 9 may be considered a front elevation view of the panel taken along the lines 10—10 of FIG. 8 and illustrates a pixel element represented by the presence of the conductive fluid 62 in the cavity 48 behind the transparent cover sheet 60. The adjacent cavity 64 is illustrated without fluid behind the transparent panel. It is apparent that an X-Y matrix of such individual cavities, such as the cavities 48 and 64, will provide a convenient replacement for bulky cathode ray tubes, or may be used as a large panel for the display of alphanumeric characters, picture images, or the like.

While this invention has been described in terms of a few preferred embodiments, it is contemplated that persons reading the preceding descriptions and studying the drawing will realize various alterations, permutations and modifications thereof. For example, the current can be induced into the conductive fluid within the conduits by well known induction techniques. Furthermore, the display panel can be constructed by a number of fabrication methods. Also, a single, large, common reservoir could be used to store the conductive fluid, rather than a large number of reservoirs associated, one each, with a pixel cavity. It should also be apparent that the current path, magnetic field path, and fluid flow path may be at other angles other than normal to one another, with a corresponding loss of efficiency (since only the normal components will pump the fluid).

It is therefore intended that the following appended claims be interpreted as including all such alterations, permutations and modifications as fall within the true spirit and scope of the present invention.

What is claimed is:

1. A display panel formed of a plurality of individual display elements, each of said plurality of elements comprising:
   a pixel cavity having an exterior surface covered with a transparent cover material forming a part of a front display surface of the display panel;
   a conduit having a longitudinal axis, said conduit being coupled between said cavity and a reservoir for the storage of an electrically conductive fluid; and
   pumping means associated with said conduit for selectively transferring said fluid between said pixel cavity and said reservoir, said pumping means being an electromagnetic pump including magnetic field producing means for generating a magnetic field in said fluid within said conduit, and current means for causing a current flow in said conductive fluid within said conduit in a direction at substantially right angles to said magnetic field and to said longitudinal axis of said conduit.

2. The display panel claimed in claim 1 wherein each reservoir has a similar size and shape as a corresponding pixel cavity.

3. The display panel claimed in claim 2 wherein said electrically conductive fluid in each of said plurality of elements substantially fills said conduit and said reservoir.

4. The display panel claimed in claim 3 wherein each reservoir coupled through said conduit to its respective pixel cavity has a transparent exterior surface forming a part of a rear display surface of said display panel.

5. The display panel claimed in claim 2 wherein each of said reservoirs has a substantially transparent exterior surface forming a part of a rear display surface, and wherein said front display surface and said rear display surface of said display panel are formed of a plurality of said pixel cavities and reservoirs in an X-Y matrix.

6. A display panel comprising:
   resrvoir means for an electrically conductive fluid;
   a plurality of pixel cavities arranged in a two dimensional matrix, each of said pixel cavities having a transparent viewing surface;
   a plurality of conduit means coupling respective ones of said plurality of pixel cavities to said reservoir means, said plurality of conduit means providing fluid paths for said conductive fluid between said plurality of pixel cavities and said reservoir means;
   means for developing a current in selected ones of said plurality of conduit means along a current path substantially normal to said fluid path; and
   means for developing a magnetic field in said selected ones of said plurality of conduit means along a magnetic path substantially normal to said fluid path and said curent path, said current and said magnetic field being developed concurrrently to urge said conductive fluid along said fluid paths.

7. The method of manufacturing a display panel having a matrix of individual pixel elements each selectively rendered visible by electromagnetically pumping an electrically conductive fluid to and from a transparent cavity in said element and forming a portion of the surface of said display panel, said conductive fluid being pumped through a conduit coupled to a reservoir cavity, said method including the steps of:
   cutting a plurality of pairs of spaced rectangular holes through the surfaces of a ferromagnetic metal panel, each pair of said rectangular holes being positioned at points corresponding to a location of a pixel element;

cutting an interconnecting slit between each rectangular hole in each of said plurality of pairs, said slit being substantially normal to a longitudinal axis of said holes and located at positions corresponding to their respective pixel element cavities;

applying a dielectric material to at least a portion of the surface of said ferromagnetic metal panel including the surface portion formed by said slit;

placing current-carrying conductors across each row of rectangular hole pairs, each of said conductors comprising a conductive bridge having two base sections, each section fitting into one of said rectangular holes and against the end of the interconnecting slit;

providing a magnetic field generating coil around a portion of said ferromagnetic metal panel, said coil being operative to develop a magnetic field across said slit between said conductive bridges along an axis substantially perpendicular thereto;

applying to a first surface of said ferromagnetic metal panel a first cavity panel containing a matrix of cavities, each having a central aperture through its inner surface that interconnects with one of said slits;

applying to a second surface of said ferromagnetic metal panel a second cavity panel containing a matrix of reservoir cavities each having a central aperture through its inner surface that interconnects with one of said slits;

filling each of said cavities in said first panel and its respective interconnecting slit with an electrical conductive fluid; and sealing the exposed matrix cavities in said second cavity panel with a cover panel.

8. The method of manufacture claimed in claim 7 wherein said second cavity panel is transparent.

9. The method of manufacture claimed in claim 7 wherein the step of sealing said second cavity panel is performed in a vacuum at a pressure approaching the vapor pressure of said conductive fluid.

10. In a display panel comprising a plurality of pixel cavities arranged in a two dimensional matrix, reservoir means for a conductive fluid, and a plurality of conduits coupling respective ones of said pixel cavities to said reservoir means; a method for pumping said fluid between said pixel cavities and said reservoir means comprising the steps of:

applying a transverse current to selected ones of said plurality of conduits to produce a current in said conductive fluid; and applying a transverse magnetic field to selected ones of said plurality of conduits at substantially right angles to said transverse current.

* * * * *